United States Patent Office 2,889,575
Patented June 9, 1959

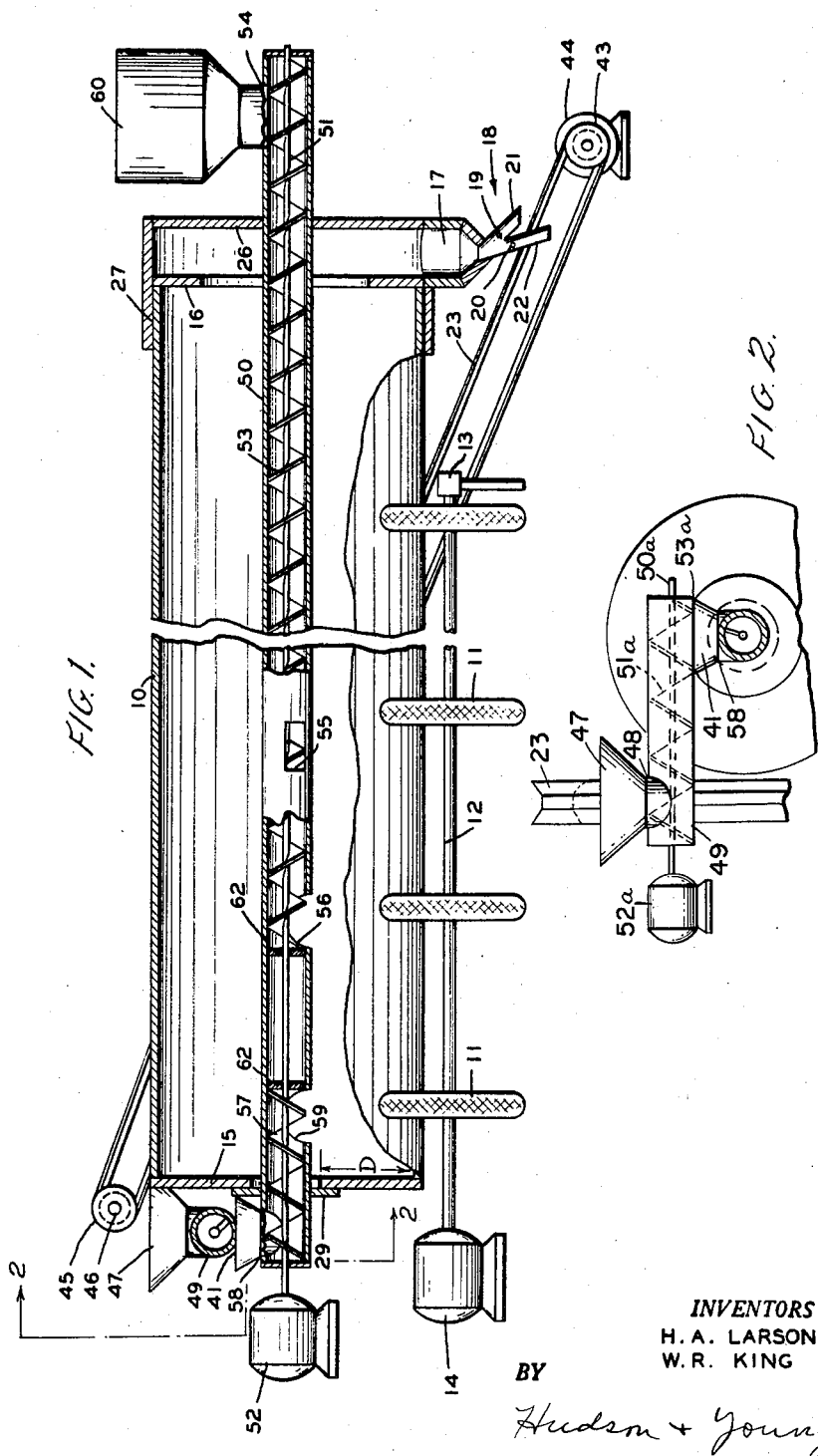

2,889,575
FEEDING MECHANISM

Harold A. Larson, Borger, Tex., and William R. King, Bartlesville, Okla., assignors to Phillips Petroleum Company, a corporation of Delaware Original application January 28, 1952, Serial No. 268,644, now Patent No. 2,786,232, dated March 26, 1957. Divided and this application November 5, 1956, Serial No. 620,466

7 Claims. (Cl. 18—1)

This invention relates to mechanism for feeding granular material. In another aspect, it relates to a process for pelleting carbon black.

Carbon black is produced in the furnace process by the incomplete combustion of carbonaceous material, such as a heavy gas oil, the carbon black being separated from the combustion gases after the reaction is completed. As it comes from the separation device, the carbon black is in a fluffy flocculent condition, and has a bulk density of approximately four pounds per cubic foot. In this condition, the black is extremely difficult to handle or package, and the bulk of the package required for holding a given weight of black is too great to permit economical shipment. Accordingly, before shipping or handling, the carbon black is subjected to a treatment whereby its density is increased.

A commercially successful and extremely satisfactory treatment of this type is the formation of the flocculent carbon black into relatively hard dense pellets. Such pellets may have a bulk density of as high as twenty-five to thirty pounds per cubic foot, as compared to approximately four pounds per cubic foot for the flocculent black. Therefore, in the form of pellets, the bulk of a package required for holding a given weight of black is substantially decreased. Further, due to the aggregation of the flocculent particles, there is little dust formation when the carbon black pellets are handled. Dust formation is a serious and annoying problem when an attempt is made to handle or package the carbon black in its fluocculent condition.

One very satisfactory method of forming pellets of carbon black is to introduce the material into a rotating cylindrical mill wherein there is a gentle "cascading" or rolling and tumbling action as the carbon black particles elevated by rotation of the mill roll and tumble transversely across the sloping surface of the bed in the mill. The resulting carbon black pellets are removed from the outlet end of the mill for packaging or shipment in tank cars. In most cases it is advantageous, and in some cases it is essential that a portion of the product pellets be recycled to the inlet end of the mill. Although the exact mechanism of the action of the recycled pellets is not known, it is believed that they are broken up in the mill into smaller sizes and serve as nuclei for the formation of larger pellets from the fluocculent black charge to the mill.

In many cases, it has been found desirable to introduce the flocculent black to the mill at a plurality of points spaced longitudinally within the peleIt mill. This has been done by the use of a plurality of screw conveyors each extending a different distance into the pellet mill. A disadvantage of this type of structure is that the opening at the inlet end of the mill must, in this case, be sufficiently large as to accommodate the plurality of screw conveyors. This creates a rather difficult sealing problem at the inlet end of the mill and prevents the bed depth in the mill from exceeding the radial distance from the outer circumference of the mill to the outer edge of the opening. In other cases, it has been proposed to utilize a single screw in such conveyors, a plurality of longitudinally spaced openings being provided in the tube surrounding the conveyor, each opening being in the bottom part of the tube. Difficulties have been experienced with this type of conveyor mechanism resulting from clogging of the openings by masses of flocculent carbon black.

It is a major purpose of this invention to provide a structure wherein the black is fed to the mill through a single conveyor and distributed at various longitudinally spaced zones within the mill with elimination of difficulties resulting from clogging.

In one embodiment of the invention, we have found desirable results to be obtained by providing a single tube extending through the mill and enclosing two screw conveyors of opposite pitch. Recycle pellets are introduced to one conveyor and pass through the inlet end of the mill to a region a short distance beyond the inlet. The flocculent black is fed through the outlet end of the mill in a second conveyor to a region closely spaced to the region of introduction of the recycle pellets. In this manner, separate introduction of the flocculent black and recycle pellets is obtained with the use of only one screw conveyor tube. In this modification, if desired, the flocculent black may be distributed at a plurality of longitudinally spaced regions within the mill.

Although we have referred hereinbefore to a process for pelleting carbon black, it will be understood that the various types of feeding mechanism coming within the scope of the invention have independent utility in other applications, particularly in the transportation of granular material.

It is an object of the invention to provide improved mechanism for feeding and distributing granular material.

It is a further object to provide an improved process and apparatus for the pelleting of carbon black.

It is a still further object to provide such a process and apparatus at a low cost, and to permit the use of a higher bed depth in a pellet mill.

Various other objects, advantages and features of the invention will become apparent from the following detailed description taken in conjunction with the accompanying drawings, in which:

Figure 1 is a vertical sectional view, partially in elevation, of a carbon black pelleting mill utilizing the feeding mechanism of our invention; and Figure 2 is a sectional view, partially broken away, taken along the lines 2—2 of Figure 1, looking in the direction of the arrows.

Referring now to the drawings in detail and particularly to Figures 1 and 2, a horizontally disposed generally cylindrical pellet mill 10 is supported by two sets of rubber tires, one of which is shown at 11, these tires being mounted upon a shaft 12 journaled in a support 13 and driven by a motor 14. When motor 14 is operated, the frictional engagement of the tires 11 with the pellet mill 10 causes the mill to rotate responsive to rotation of the tires. The mill 10 is provided with an annular plate 15 at its inlet end and with an annular plate 16 at its outlet end. When flocculent carbon black is introduced into the inlet end of the mill, carbon black pellets are formed by the "cascading" or rolling and tumbling action of the particles caused by rotation of the mill. The pellets so formed are discharged through the opening in end plate 16 into a chamber 17. It will be understood that the size of the opening 18 in plate 16 regulates the bed depth in the mill, the plate forming, in effect, a wier or dam over which the pellets are discharged into the chamber 17. From the chamber 17, the pellets flow to a proportioning device 18 which divides the withdrawn pellets into a recycle and a product portion, the distribution between which is controlled by dampers 19, 20 in outlet conduits 21 and 22, respectively. The product pellets flowing through conduit 22 are packaged in sacks or transported to tank cars for shipment while the recycle pellets from conduit 21 are discharged upon an endless belt 23 to be hereinafter described in more detail.

Extending axially through the mill 10 is an elongated stationary tube 50 which is mounted upon suitable supports, not shown, outside the pellet mill. The stationary tube 50, in turn, supports a housing 26 defining the chamber 17 so that there is a bearing surface 27 between the stationary housing 26 and rotatable mill 10. The tube 50 can also carry stationary scrapers, not shown to remove deposits of carbon black from the sides of the mill. It will be noted that, at the inlet (left) end (i.e., the end where the pelleting action begins on the flocculent black) of the mill, an annular sealing member 29 is provided which is carried by the end plate 15 and rubs against the stationary tube 50. The central opening in annular plate 15 need only only be sufficiently large as to accommodate the tube 50 without rubbing or engagement between the tube and plate. This greatly simplifies the sealing problem as the bed depth can be as great as the radial distance D between the outer surface of the mill and the outer edge of the opening in plate 15 without any tendency for the material within the mill to flow through this opening, which tendency would greatly increase the sealing problem. Furthermore, if a plurality of conveyors were utilized or if separate feeding conduits were employed for the flocculent black and recycle material it would be necessary to increase the size of the opening in plate 15 to accommodate the extra tubes or conduits. This, in turn, would decrease the distance D and, hence, the allowable bed depth permitted without involving a serious sealing problem at the inlet (left) end of the mill.

Journaled in the tube 50 is an axial shaft 51 driven by a motor 52. Mounted upon the shaft 51 is helical metal plate 53 forming a screw conveyor, the plate being of the proper pitch to convey granular material, such as carbon black, from a feed opening 54 located outside and adjacent the outlet end of the mill to a pair of discharge openings 55 and 56. Also mounted upon the shaft 51 is a helical metal plate 57 which forms a screw conveyor of reverse pitch to remove granular materials from a feed opening 58 outside and adjacent the inlet end of the mill to a discharge opening 59 outside and adjacent the inlet end of the mill.

Flocculent carbon black is continuously introduced into the screw conveyor 53 from a hopper 60 cooperating with feed opening 54. Recycle pellets from the outlet end of the mill are introduced into a hopper 41 cooperating with feed opening 58 in the manner now to be described. As previously stated, pellets from the outlet end of the mill pass through chamber 17 and proportioning device 18 to the endless belt 23. This belt is carried between a pulley 43 driven by a motor 44 and a pulley 45 suitably journaled at 46 upon a support, not shown. The belt is inclined and is located at the side of the pellet mill, the direction of belt rotation being such that the recycle pellets falling upon the belt are carried upwardly thereby from the outlet end to the inlet end of the mill and discharged into a hopper 47 which communicates with a feed opening 48 in a tube 49. A shaft 50a carrying a screw conveyor 51a and driven by a motor 52a conveys the recycle pellets laterally from the feed opening 48 to a discharge opening 53a communicating with the hopper 41 and feed openings 58 of the tube 50.

It will be understood that no recycling is required in the formation of pellets from certain types of flocculent carbon black. It will be further understood that the feeding mechanism described herein in connection with the carbon black pelleting unit has independent utility in other industrial applications.

Flocculent carbon black is fed from a hopper 60 through the feed opening 54 and conveyor 53 to the discharge openings 55, 56 in the mill. Pellets leaving the mill are divided into a product portion and a recycle portion by the proportioning device 18, the recycle portion being carried by belt 23 to hopper 47 from which it passes through conveyor 51a, Figure 2, to the hopper 41 and feed opening 58, Figure 3. The recycle pellets are carried inwardly by the conveyor 57 and discharged into the mill through the opening 59. It will be noted that the shaft 51 extends through plates 62 which are closely spaced or welded to the respective openings 56, 59 and serve to separate the two conveyor sections carrried by the shaft 51. In this manner, the flocculent black and recycle pellets are separately introduced into the mill by the use of only one tube 50 passing through the inlet and outlet ends of the mill. In this manner, the desired bed depth can be maintained without creating a sealing problem at the inlet end of the mill and a very compact and efficient arrangement is provided.

In a forty-eight foot mill, discharge opening 59 is approximately eighteen inches from the inlet end of the mill, discharge opening 56 is approximately five feet from the inlet end of the mill and discharge opening 55 is approximately ten feet from the inlet end of the mill. In this manner, the recycle pellets are "cascaded" for a short interval before the flocculent black is added thereto which has been found to be desirable in many types of operation.

Depending upon particular types of material to be pelleted and other operating conditions, one or more than two discharge openings can be used in connection with conveyor section 53 and one or more discharge openings can be used in connection with conveyor section 57. However, where more than one discharge opening is utilized, it is important that all such openings, except the innermost one, be angularly spaced from the bottom portion of the tube 50. That is, such discharge openings should be positioned in the side wall of the tube, as is discharge opening 55, to prevent difficulties arising from clogging of the openings by the carbon black particles. The conveyor system is quite flexible and requires little maintenance since both sections of the conveyor are positioned upon a single shaft and enclosed within a single tube, which tube is ordinarily provided in pellet mills to form a support for a stationary scraper device, not shown. Finally, the feeding mechanism of our invention permits the use of a greater bed depth without troublesome sealing problems, thereby improving the stability of operation of the mill and the uniformity in size and hardness of the product pellets.

This application is a division of our copending application Serial No. 268,644, filed January 28, 1952 now U.S. Patent No. 2,786,232.

We claim:

1. Feeding mechanism comprising, in combination, an elongated tube, a shaft mounted axially within said tube, a disk carried by said shaft and closely spaced to the walls of said tube at an intermediate portion thereof, discharge openings in said tube on the respective opposite sides of said disk, and positioned adjacent thereto, a feed opening in said tube on each side of said disk, each feed opening being spaced from its corresponding discharge opening, a helical metal plate secured to said shaft and having two sections of opposite pitch for conveying material from said feed openings to the respective discharge openings, and means for rotating said shaft.

2. Feeding mechanism comprising, in combination, an elongated tube, a shaft mounted axially within said tube, a disk carried by said shaft and closely spaced to the walls of said tube at an intermediate portion thereof, a discharge opening in said tube on each side of said disk and positioned adjacent thereto, a feed opening in said tube on each side of said disk, each feed opening being spaced from its corresponding discharge opening, a helical metal plate secured to said shaft and having two sections of opposite pitch for conveying material from said feed openings to the respective discharge openings, a pair of hoppers for feeding granular material to the respective feed openings, and a motor for rotating said shaft.

3. Feeding mechanism comprising, in combination, an elongated tube, a disk closely spaced to the walls of said tube at an intermediate portion thereof, a discharge opening in said tube on each side of said disk and positioned adjacent thereto, a feed opening in said tube on each side of said disk, each feed opening being spaced from its corresponding discharge opening, a conveyor including a helical metal plate having two sections of opposite pitch for conveying material from said feed openings to the respective discharge openings, a pair of hoppers for feeding granular material to the respective feed openings, a motor for rotating said conveyor, and a discharge hole in said tube between one of said feed openings and its associated discharge opening, said hole being angularly spaced about the circumference of said tube with respect to said associated discharge opening.

4. Feeding mechanism comprising, in combination, an elongated tube disposed in a horizontal position, a screw conveyor rotatably mounted in said tube and having two sections of opposite pitch to convey material from the respective ends of said tube toward the middle thereof, feed openings at the respective ends of said tube to introduce granular material into said conveyors, a discharge opening in one section of the tube at the bottom portion thereof to discharge material carried by said one section of said conveyor, a discharge opening at the bottom portion of said tube to discharge material from the said second conveyor section, and a discharge hole between the last-mentioned discharge opening and its associated feed opening, said hole being angularly offset from the bottom portion of the tube.

5. Apparatus for pelleting carbon black which comprises, in combination, a generally cylindrical pellet mill having an inlet end and an outlet end, means for rotating said pellet mill, a non-rotatable tube extending axially through said pellet mill, means for feeding flocculent carbon black through said tube from the outlet end of the mill to a position closely spaced to the inlet end of the mill, means for withdrawing pellets of carbon black from the outlet end of said mill, and means for introducing a portion of the withdrawn pellets through said tube into the mill through the inlet end of said mill.

6. In apparatus for pelleting carbon black, in combination, a generally cylindrical pellet mill having an inlet end and an outlet end; a non-rotatable tube extending through said pellet mill, said tube being divided into a short inlet section and a long outlet section extending through said mill inlet and outlet ends respectively, each said section having a feed opening outside the mill and a discharge opening within the mill; screw conveyors of opposite pitch within said sections to convey material from the feed openings to the respective discharge openings; means for feeding flocculent carbon black to the feed opening of the outlet section; means for withdrawing pellets of barbon black from said mill; and means for conveying a portion of the withdrawn pellets to the feed opening of the inlet section, and means for rotating said screw conveyors.

7. Apparatus for pelleting carbon black which comprises, in combination, a generally cylindrical pellet mill having an inlet end and an outlet end, means for rotating said pellet mill; a non-rotatable tube extending axially through said mill; a central shaft extending through said tube; said shaft having a disk thereon closely spaced to the walls of the tube at a region close to the inlet end of the mill; said tube having a feed opening outside the mill adjacent the inlet end thereof and a feed opening outside the mill adjacent the outlet end thereof; and a pair of discharge openings on opposite sides of said disk and closely spaced thereto; screw conveyor sections of opposite pitch carried by said shaft to convey material from the feed openings to the respective discharge openings, means for rotating said shaft; means for introducing flocculent carbon black into said feed opening adjacent the outlet end of the mill; means for withdrawing pellets of carbon black from the outlet end of the mill, a proportioning device for dividing said pellets into a product portion and a recycle portion; an endless belt extending upwardly at the side of the mill from the outlet to the inlet end thereof; means for feeding said recycle portion of pellets onto said belt; a hopper for collecting pellets discharged from the belt; a conveyor extending from said hopper to said feed opening adjacent the inlet end of the mill; said conveyor having a feed opening communicating with said hopper and a discharge opening communicating with said feed opening in the tube adjacent the inlet end of the mill.

References Cited in the file of this patent

UNITED STATES PATENTS

| | | |
|---|---|---|
| 2,503,361 | Studebaker | Apr. 11, 1950 |
| 2,686,335 | Gross | Aug. 17, 1954 |